F. B. BLACK.
AUTOMOBILE HEADLIGHT.
APPLICATION FILED OCT. 11, 1920.
1,400,259.
Patented Dec. 13, 1921.
2 SHEETS—SHEET 1.
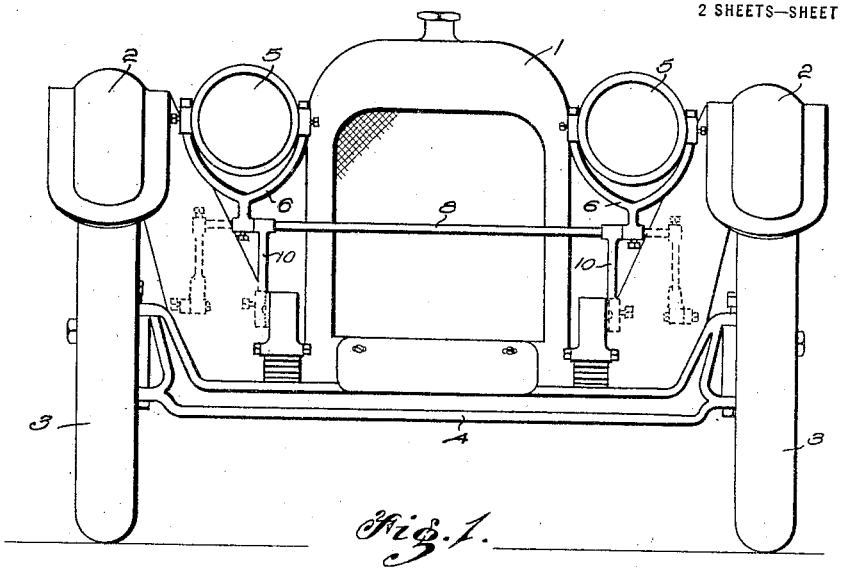
Fig. 1.
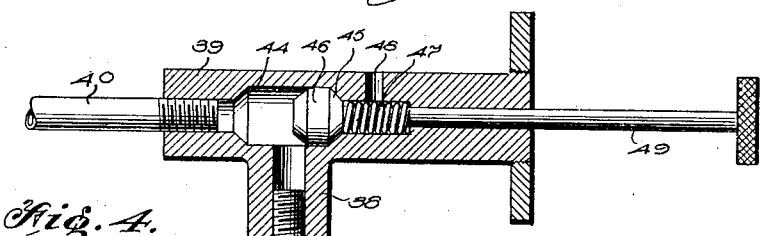
Fig. 4.
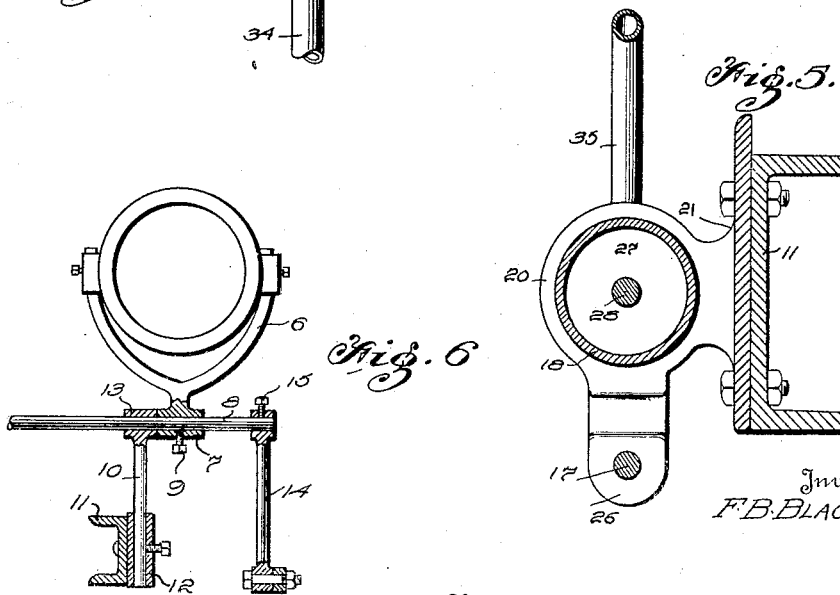
Fig. 5.
Fig. 6.
Inventor
F. B. BLACK
By
Chr. Farken Attorney

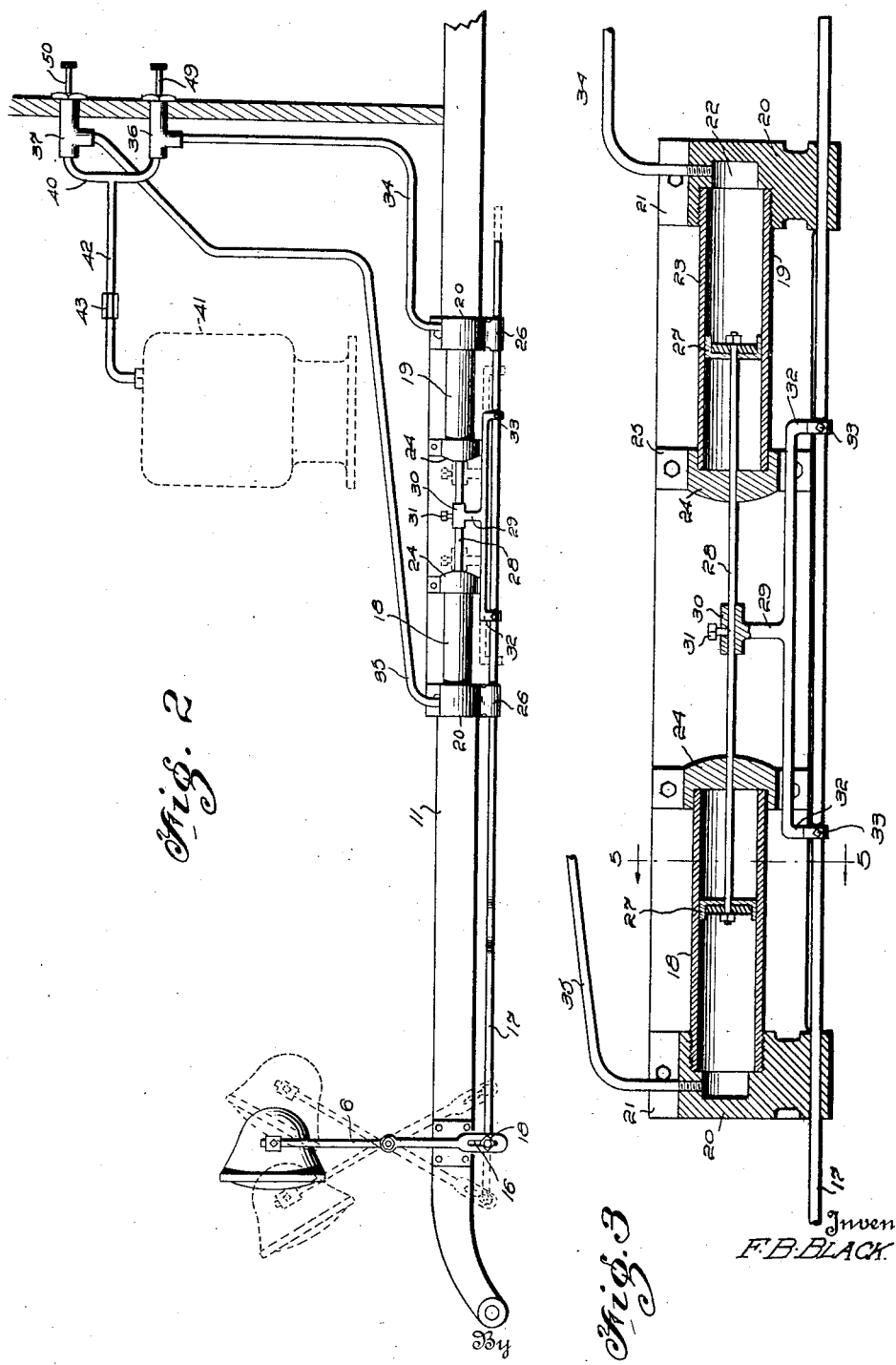

UNITED STATES PATENT OFFICE.

FRANK B. BLACK, OF LISCOMB, IOWA.

AUTOMOBILE-HEADLIGHT.

1,400,259. Specification of Letters Patent. Patented Dec. 13, 1921.

Application filed October 11, 1920. Serial No. 416,174.

*To all whom it may concern:*

Be it known that I, FRANK B. BLACK, a citizen of the United States, residing at Liscomb, in the county of Marshall and State of Iowa, have invented certain new and useful Improvements in Automobile-Headlights, of which the following is a specification.

This invention relates to automobile headlights, and it comprises a lamp, a pivoted bracket supporting said lamp, a reciprocating rod connected to said bracket, a pair of cylinders mounted on the frame of the machine, pistons mounted in said cylinders and connected to said reciprocating rod, and means for establishing pressure in either of said cylinders to actuate the piston therein and reciprocate said rod.

In the present invention, I have provided control mechanism for the headlights of automobiles and other vehicles, whereby the position of the lamps may be changed to throw the light a considerable distance ahead of the vehicle or may be tipped down so that the full amount of light strikes the ground immediately ahead of the car. By the use of the present invention, the lamps may be positioned to throw the light on the road immediately ahead of the car when passing another machine, so that the driver is given the benefit of the full candle power of the head lamps and at the same time there is no glare in the eyes of the driver of the passing machine. After the other machine has been passed, the lamps may be returned to their original position.

The invention comprises operating mechanism consisting of a pair of cylinders adapted to receive gas under pressure to operate the lamp tipping mechanism. The lamps are thus always subjected to the cushioning effect of gas under pressure, and the jar on the lamps and bulbs is materially decreased.

By the use of the present invention, when two machines are passing each other on the road and traveling in opposite directions, the full amount of light may be used and the possibility of "blinding" the driver of the passing machine is removed. It is, therefore, unnecessary to use the usual "dimmers" which frequently do not give sufficient light. When ascending or descending a grade, the position of the lamps may be adjusted to throw the light on the road at any desired distance in front of the machine.

In the accompanying drawings, I have shown one embodiment of the invention. In this showing:

Figure 1 is a front elevation of a motor vehicle equipped with head lamps in accordance with the invention, Fig. 2 is a side elevation of the apparatus, showing its position on the machine, Fig. 3 is a longitudinal horizontal sectional view, Fig. 4 is a detail view of the valve control, Fig. 5 is a vertical transverse sectional view through one of the cylinders, and, Fig. 6 is a detail view of the lamp supporting bracket.

Referring to the drawings, the reference numeral 1 designates the radiator of a motor vehicle having the usual fenders or mud guards 2. The vehicle is equipped with wheels 3, mounted on an axle 4, and the head lamps 5 are positioned between the radiator and the front wheels in the usual manner. Referring to Fig. 6 of the drawings, the lamp bracket 6 is provided with a sleeve 7, adapted to receive cross rod 8. The lamp and bracket are rigidly secured to this rod by means of a bolt 9. Supporting brackets 10 are secured to the frame 11 of the machine at each side, the brackets being received in sleeves 12, carried by the frame, and being provided with sleeves 13 at their upper ends for the reception of the cross rod. The cross rod is loosely mounted in the sleeves 13 and is adapted to revolve therein. A crank 14 is secured to the end of the cross rod, the crank being rigidly connected thereto by a set screw 15. The lower end of the crank is provided with a slot 16 (see Fig. 2) and a connecting rod 17 is secured in this slot by means of a nut 18.

Referring to Figs. 2 and 3 of the drawings, the connecting rod extends longitudinally of the machine, substantially parallel to the side bar of the frame 11. A pair of cylinders 19 are supported on the frame of the machine, the cylinders being arranged in alinement with each other. Each of the cylinders comprises an outer block or head 20, having legs or supports 21 adapted to rest on the bar 11 of the frame and secured thereto in any suitable manner. The block is provided with a recess 22, a portion of which is threaded for the reception of the end of a tube 23, forming the body portion of the cylinder. The opposite ends of the cylinders are closed by heads or blocks 24, having recesses on their inner faces for the reception of the end of the cylinder and being provided with supporting members 25, by means of which they are secured to the frame. The outer heads 20 are provided with extensions or ears 26, having openings therein for the reception of the connecting rod, these ears forming guides for said rod. A piston 27 is mounted in each of the cylinders and these pistons are connected by a piston rod 28, extending through openings in the inner head 24. A substantially T-shaped member 29 is connected to the piston rod, the member being provided with a sleeve 30, having an opening therein for the reception of the rod. The piston rod and the T-shaped member are secured to each other by means of a set screw 31. The ends of the T-shaped member are extended at substantially right angles, as at 32, and are provided with openings for the reception of the connecting rod, the connecting rod being secured in these openings by set screws 33. A pair of pipes 34 and 35 are connected to the outer ends of the two cylinders. These two pipes lead to valve chambers 36 and 37. The detail construction of one of the valve chambers is shown in Fig. 4 of the drawings. As shown, it comprises a lower extension 38, adapted to receive the connecting pipe of the cylinder and a lateral extension 39. The lateral extension is connected to a pipe 40, which is connected to one of the engine cylinders indicated at 41, by means of pipe 42. A check valve 43 may be arranged in this pipe. The valve chamber is provided with a pair of oppositely disposed valve seats 44 and 45, and a double faced valve 46 is adapted to be arranged within the valve chamber. A spring 47 is arranged within the valve chamber and is adapted to retain the valve in the position shown in Fig. 4 of the drawings. The valve chamber is provided with an opening 48, communicating with the atmosphere. The valves in the chambers 36 and 37 are provided with valve stems 49 and 50, respectively.

The operation of the invention is as follows:

The lamps are pivotably mounted and are adapted to be swung in the arc of a circle or oscillated by the connecting rod 17 through the crank 14. The connecting rod is connected to the piston rod which carries the pistons 27 and is reciprocated by unbalancing the pressure in the engine cylinders. The cylinders are connected to one of the engine cylinders to normally maintain equal pressure in the cylinders and maintain the lamp in the full line position shown in Fig. 2 of the drawings. When the angle of the lamp is to be changed, one of the valves 46 is moved inwardly by the driver of the machine by pressing on the valve stem 49 or 50. When the valve in the chamber 36 is moved inwardly from its normal position, the cylinder 19 is cut off from the engine cylinder. The gas in this cylinder is then exhausted through pipe 34 and opening 48. Additional gas under pressure is fed to the cylinder 18 through pipes 35, 40, and 42, passing through valve 37, and the connecting rod is moved rearwardly to tip the lamp forwardly. When it is desired to return the lamp to normal position, the valve in the chamber 49 is allowed to return to normal position and the valve in chamber 50 is moved to the other position to permit exhaust of gas through the exhaust opening in valve chamber 37. The lamp may be maintained at any angle by allowing the valve to assume a normal position when the lamp is at the desired angle. To tip the lamp rearwardly, the valve in the chamber 37 is operated in the manner heretofore described to cut off cylinder 18 from the engine cylinder and opening it for exhaust.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. Vehicle head lamp tilting mechanism, comprising a pair of cylinders, reciprocating pistons arranged in said cylinders, means for connecting said pistons to the lamps of the vehicle, and control means comprising a pair of valve chambers, each of said valve chambers being provided with an inlet opening connected to a source of compressed gas and an exhaust opening, and being further provided with an opening communicating with one of said cylinders arranged intermediate said first mentioned openings, a valve arranged in each of said valve chambers adapted to be moved to the ends of the valve chambers to permit communication between either of said first two openings and the opening connected to the cylinder.

2. Vehicle head lamp tilting mechanism comprising a pair of cylinders, reciprocating pistons arranged in said cylinders, means for connecting the lamps of the vehicle to said pistons, control means comprising a pair of substantially T-shaped valve casings, the upper end of the valve casing being provided with an inlet opening connected to a source of compressed gas and an exhaust opening, the leg of the T-shaped valve casing being provided with an opening communicating with one of the cylinders, and a valve arranged in the upper portion of the valve casing and adapted to be moved to either end thereof to permit communication between the opening connected to the cylinder and either of said first mentioned openings.

In testimony whereof I affix my signature in presence of two witnesses.

FRANK B. BLACK.

Witnesses:
E. F. CLARK,
CYRUS SMALL.